United States Patent [19]

Hoffmann et al.

[11] Patent Number: 5,369,872
[45] Date of Patent: Dec. 6, 1994

[54] PROCESS FOR THE ADJUSTMENT OF VARIOUS COMPONENTS OF A RELAY

[75] Inventors: Wolfgang Hoffmann, Lippstadt; Maik Zimmer, Erwitte; André Körner, Lippstadt, all of Germany

[73] Assignee: Hella KG Hueck & Co., Lippstadt, Germany

[21] Appl. No.: 160,197

[22] Filed: Dec. 2, 1993

[30] Foreign Application Priority Data

Dec. 23, 1992 [DE] Germany ............................ 4243854

[51] Int. Cl.$^5$ ............................................ H01F 41/02
[52] U.S. Cl. .................................... 29/593; 29/602.1; 29/622
[58] Field of Search .................. 29/593, 602.1, 622, 29/606

[56] References Cited

U.S. PATENT DOCUMENTS

| | | |
|---|---|---|
| 3,239,630 | 3/1966 | Obszarney et al. |
| 3,295,078 | 12/1966 | Hrynewycz . |
| 4,611,392 | 9/1986 | Bell . |
| 5,081,756 | 1/1992 | Abe et al. |
| 5,093,979 | 3/1992 | Kwapisz . |

FOREIGN PATENT DOCUMENTS

| | | |
|---|---|---|
| 2705961A1 | 8/1977 | Germany . |
| 2619002C3 | 2/1979 | Germany . |
| 2952271A1 | 7/1981 | Germany . |
| 3209198C2 | 11/1982 | Germany . |
| 3235714A1 | 3/1984 | Germany . |
| 4103258A1 | 8/1992 | Germany . |

*Primary Examiner*—Carl E. Hall
*Attorney, Agent, or Firm*—Griffin Butler Whisenhunt & Kurtossy

[57] ABSTRACT

A process for the adjustment of various components of a relay involves use of measuring devices which monitor the respective components as they are slid, or shoved, into mounting positions and, in response to the components achieving correct, or desired, positions, automatically issue signals to welding apparatus to automatically weld the components in these desired positions relative to a base plate.

The process of this invention is particularly suited for uncomplicated, cost-effective and fully automatic adjustments of relay components during their assembly, and this is particularly true for small-structure, or micro, relays.

10 Claims, 3 Drawing Sheets

PROCESS FOR THE ADJUSTMENT OF VARIOUS COMPONENTS OF A RELAY

BACKGROUND OF THE INVENTION

This invention concerns a process for the adjustment of various components of a relay.

Modern motor vehicles, which have a multiplicity of electronic apparatus, particularly employ, among other components, relays. In this regard, small size, or small structure, relays, so-called microrelays, that only require a small amount of mounting space, and therefore can be particularly easily integrated into complex electronic circuits, are increasingly preferred.

Naturally, a very reliable operation and long life span is demanded when microrelays are employed. At the same time, the manufacturing costs of such relays should, of course, remain low. Therefore, the manufacture of microrelays presents the following problems:

For large structure relays generally, manufacturing procedures are preferred which can be carried out without adjustments of assembled relay components, because adjustment-process steps increase costs.

Particularly small microrelays require, compared to large relays, an especially exact fabrication process. The individual relay components can therefore, as is required by their size, have only very small manufacturing tolerances so that the fabrication of microrelays is relatively expensive. Experience has shown that, for the manufacturer of microrelays, it is more expedient to allow larger manufacturing tolerances when manufacturing individual relay components and then, because of this, upon assembling the components, performing adjustments, particularly adjustments of positions of the components relative to one another.

This proves to be particularly cost-effective if adjustments can be made in a fully automatic manner during assembly.

In this regard, a process is disclosed in German Offenlegungsschrift DE-OS 32 35 714, for example, in which a position of a contact spring can be adjusted with the help of a laser beam. That is, a high-energy laser beam is directed by a calculator control optical deflection apparatus toward predetermined (i.e. calculated) points on the contact spring to be adjusted. The respectively illuminated, or energized, points, are dependent upon an instantaneous position of the contact spring relative to a desired position thereof. The instantaneous position of the contact spring is, in a further embodiment of this process, monitored by an electro-optic recording apparatus, for example a CCD-Matrix Camera. By means of the Laser energy it is intended that the contact spring will be deformed in a calculated manner by this selective heating so that it is brought to a desired position.

German Offenlegungsschrift DE-OS 32 35 714 suggests a rather expensive process which makes possible only the adjustment of relay components which can be deformed by means of local heating. The application of this process to adjust relay components is substantially limited to adjustment of a contact spring.

This process is also necessarily expensive because a very precisely functioning optical deflection apparatus is required for steering the laser beam and in that an algorithmic interdependence between the illuminated point, illumination time, and a targeted deformation of the respected component to be adjusted must be exactly known for controlling the deflection apparatus.

It is an object of this invention to provide a process for adjusting a relay of a type comprising a base plate, an L-shaped fixed contact terminal, a switching contact spring supporting an armature, and a magnetic system (which is comprised of a yoke, core, and coil) (as is, for example, disclosed in German Offenlegungsschrift DE 27 05 961 A1, and U.S. Pat. No. 3,295,078) which makes possible the adjustment of various relay components in an uncomplicated, cost-effective and fully automated manner.

SUMMARY

According to principles of this invention, positions of components of a relay which are constructed to be shoved, or slid, into their desired positions in a guided manner during mounting thereof are monitored by measuring devices during such mounting. The measuring devices issue signals, when the components are in their desired positions, to welding apparatus which, upon receiving these signals, automatically weld the respective components in their instantaneous positions to thereby affix them relative to a base plate.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
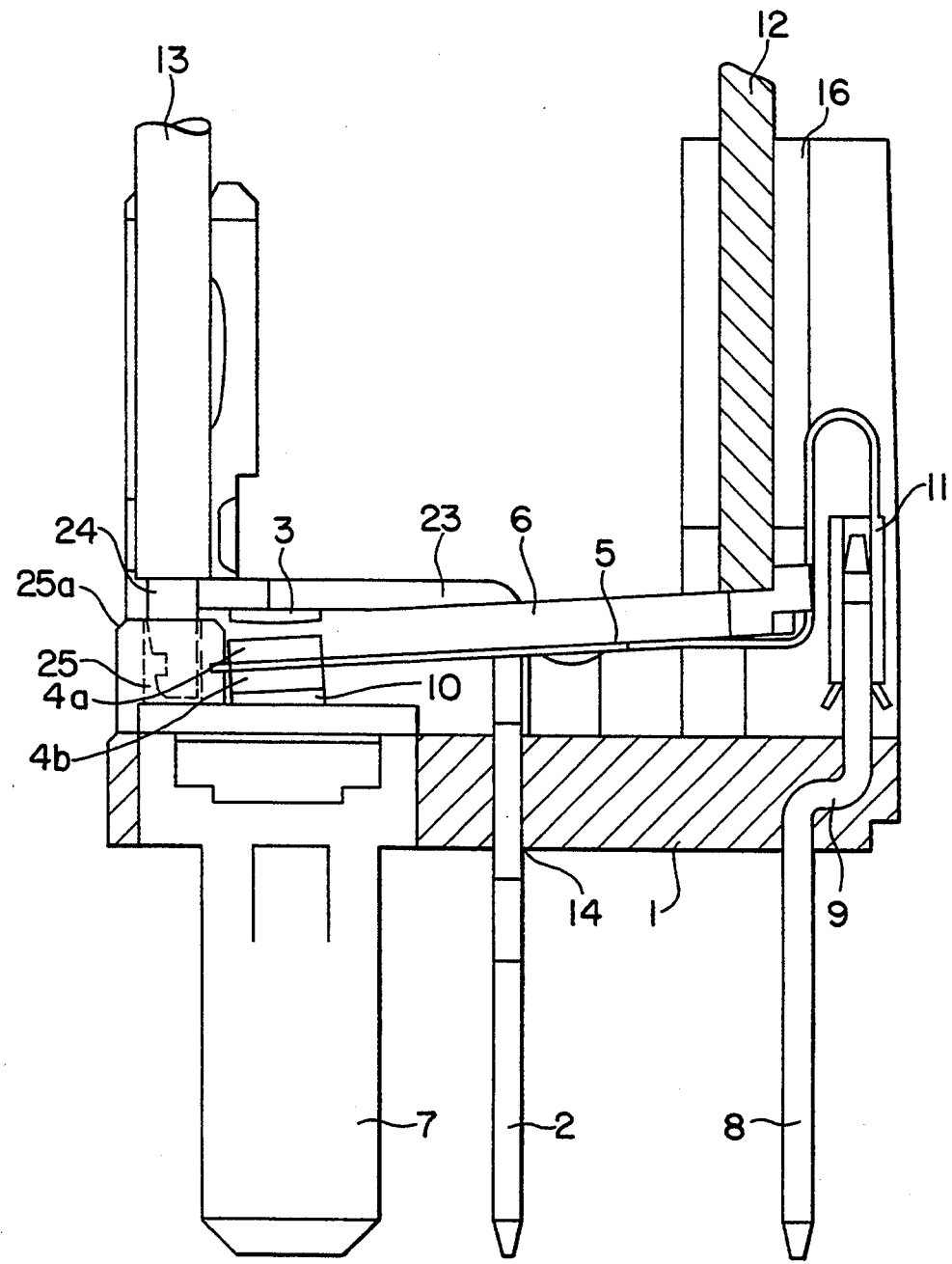
FIG. 1 is a side elevational view, partially cutaway, of a portion of a relay body, during its assembly, showing a normally-open contact tongue mounted on a base plate for illustrating an adjustment step for adjusting a position of a normally-open contact.

FIG. 1 illustrates the application of a first group of process steps of this invention for adjustment of a normally-open contact tongue 2 relative to a base plate 1.

The relay construction comprises, during this phase of assembly, a base plate 1, preferably constructed of resinous plastic, in which a plurality of terminal tongues 7, 8, for example, are molded to the base plate to be immovable therein. The terminal tongues 7 and 8 can, in this regard, as can the terminal tongue 2, be placed in a recess 14 and molded or adhered therein. The terminal tongues can also, as for example is indicated for the terminal tongue 8, have a kink, or bend, in an area of the base plate 1 to ensure, in an uncomplicated manner, that they cannot be moved relative to the base plate 1.

An intermediate portion of a switching contact spring 5 is riveted to an armature 6. Further, the switching contact spring 5 supports at an end of thereof a coupling element 11 which is slidably placed on a portion of the terminal tongue 8. At an opposite end thereof, the switching contact spring 5 has upper and lower switching contacts 4a and 4b respectively positioned on opposite sides thereof whereby the upper switching contact 4a is directed toward a normally-open contact 3 and the lower contact 4b is directed toward a normally-closed contact 10.

Adjustment of the normally-open contact tongue 2 serves to adjust a spacing between the upper switching contact 4a and the normally-open contact 3. In this regard, first the armature 6 and the switching contact spring 5, which is attached thereto, are brought to approximate positions which they will assume upon the later mounting of a yoke-rivet-group which is not shown in FIG. 1, by means of a yoke dummy 12 which is shoved into a guide slot 16 provided for receiving the magnetic yoke. The switching contact 4b then lies on the normally-closed contact 10.

According to the process of this invention, a smaller leg of the substantially L-shaped normally-open contact tongue 2 is shoved by an adjusting stamp 13 relative to the base plate 1. The normally-open contact tongue 2 has at the outer end portion of its shorter leg a laterally-extending finger 24 which engages in a cavity of a "drawer-cavity-forming" element 25 (similar to a drawer cabinet) which is integral with the base plate 1. During the shoving, or flexing, of the shorter leg of the normally-open contact tongue 2 an automatic measuring device registers a contact spacing between the switching contact 4a and the normally-open contact 3. A calculator, or comparator, compares the contact spacing with a desired contact spacing. If these two spacings correspond, when a predetermined window of tolerance is taken into consideration, the at least one finger 24 is affixed to the drawer-cavity-forming element inside its cavity. Because the normally-open contact tongue 2 normally is constructed of metal, and the base plate 1 as well as element 25 formed thereon are normally of a resinous plastic material, ultrasound welding is particularly suited for affixing the at least one finger 24 to an inner surface of the drawer-cavity-forming element 25. The affixing of the finger can, however, be quickly performed with a fast-curing adhesive or a heating stamp.

Figure 2:
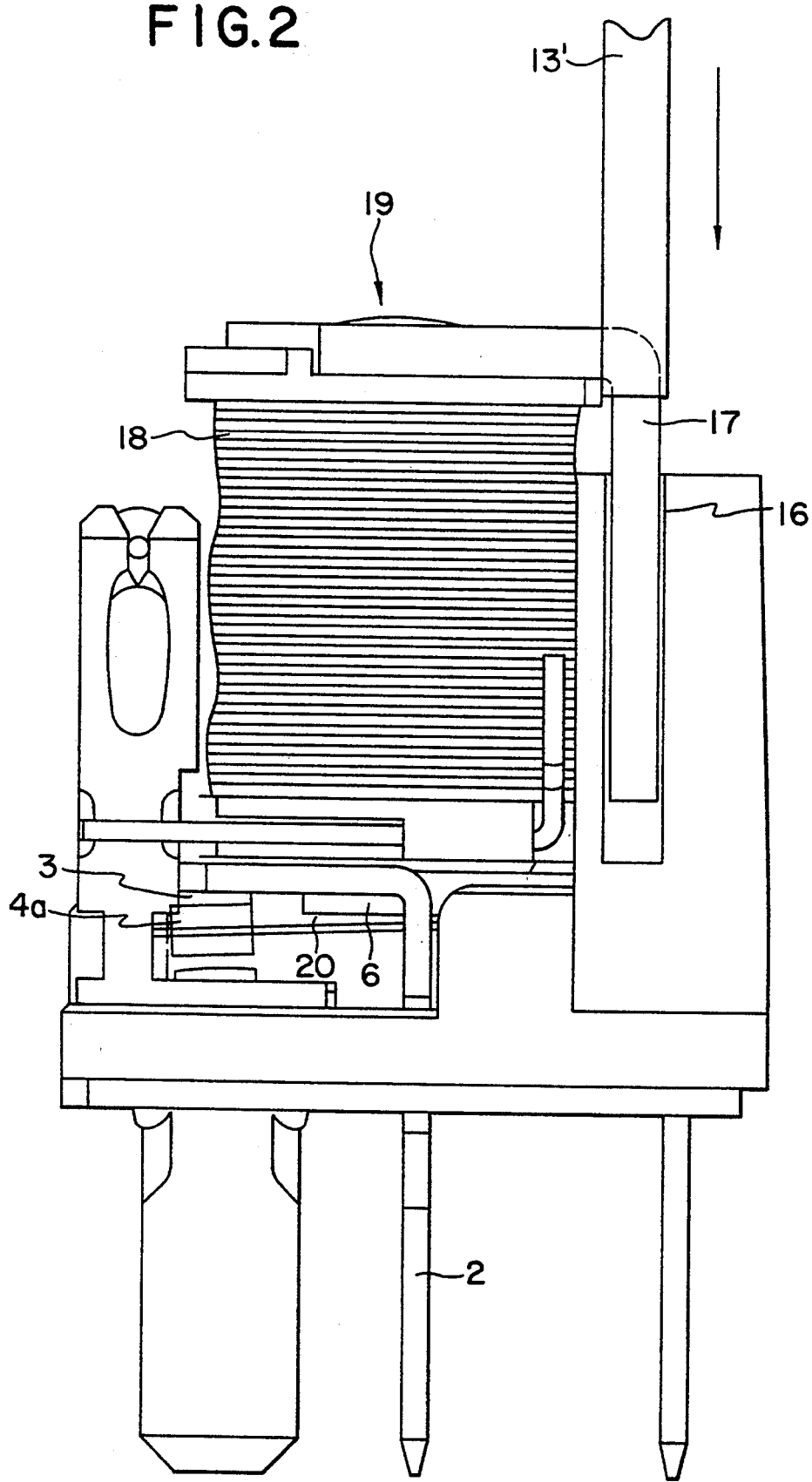
FIG. 2 is a side elevational view of the relay of FIG. 1, but with a yoke-rivet-group thereon, illustrating an adjustment step for adjusting a position of the yoke-rivet-group.

In a second embodiment of the process of this invention, the position of a yoke-rivet-group is adjusted relative to a relay structure which exists at that point. This is explained in more detail with reference to FIG. 2.

The adjustment of the yoke-rivet-group 19 requires that a spacing between the armature 6 and the coil core be adjusted so that the armature, upon application of a predetermined energizing voltage, is reliably pulled toward engagement with the coil core, whereby a sufficient contact pressure between the switching contact 4a and the normally-open contact 3 is assured.

For this adjustment, a yoke portion 17 is firstly inserted into the guiding slot 16 which is parallel to a coil axis. A sufficient excitation, or attraction, voltage is applied to the magnetic coil 18.

Then, by means of an adjusting stamp 13' the entire yoke-rivet-group 19 is moved in a direction towards the armature 6 until the armature 6 is pulled toward the core of the magnetic coil 18. The yoke-rivet-group 19 is then moved by the adjustment stamp 13' until a predetermined intermediate space 20 between the switching contact spring 5 and the armature 6, which predetermined measurement is stored in an attached register, is reached. The intermediate space 20 formed between the switching contact spring 5 and the armature 6 is monitored by means of an automatic measuring device. As soon as the predetermined measurement 20 is reached, a signal is sent by the measuring device to an ultrasound welding apparatus which welds the yoke-rivet-group 19 to the guide 16, for example, thereby affixing it in place relative to the base plate 1.

It is beneficial to carry out both adjustment steps (the position of the yoke-rivet-group 19 as well as the position of the normally-open contact tongue 2) for a single relay with the same attached register or calculator.

Figure 3:
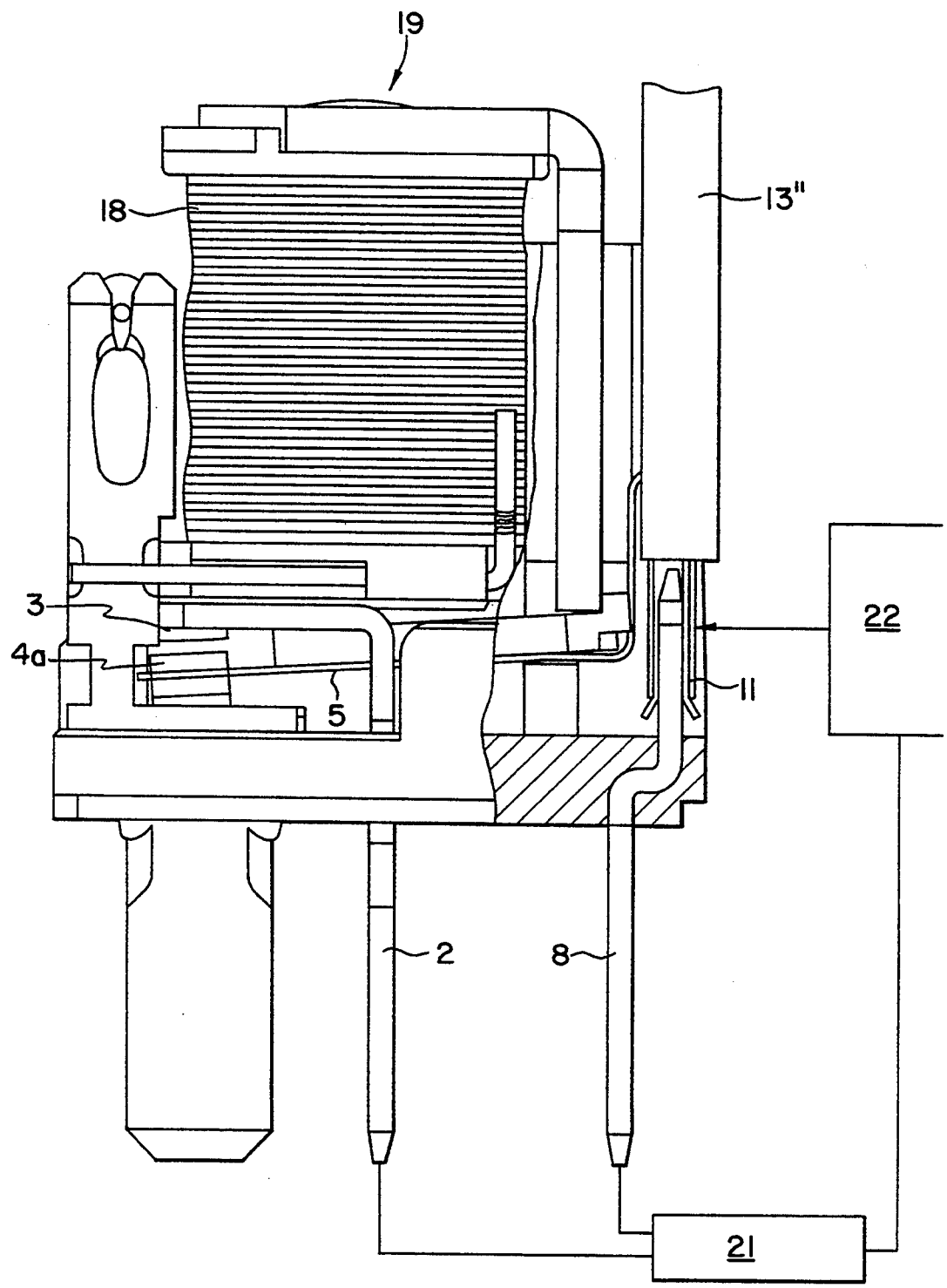
FIG. 3 is a side elevational view, partially cutaway, of a completely fabricated microrelay of FIG. 1 illustrating an adjustment step for adjusting the position of a switching contact spring.

A third group of adjustment process steps of this invention is described with reference to FIG. 3.

In this adjustment procedure, the position of the switching contact spring 5 relative to the terminal tongue 8 is adjusted. The normally-open contact tongue 2 and the yoke-rivet-group 19 have already been adjusted to their correct positions.

The adjustment of the position of the switching contact spring 5 relative to the terminal tongue 8 allows now a fine adjustment of a minimum pull, or attraction, voltage. First, the predetermined minimum attraction voltage is applied to the magnetic coil 18. Thereafter, the coupling element 11, which is preferably constructed as a spring clamp, is shoved, or pulled (slid), by means of an adjustment stamp 13" until the relay activates (the armature moves).

This process is controlled by a measuring device 21 which, by means of a current measurement on the terminal tongues 2 and 8, determines if there is an electrical contact between the switch contact 4a and the normally-open contact 3. As soon as the measuring device 21 registers activation of the relay, it controls a welding apparatus 22 to weld, and thereby affix, the coupling element 11 in its present, or actual, position.

Because in this case two metallic objects, namely the terminal tongue 8 and the coupling element 11, are to be welded to one another, the welding apparatus 22 is preferably a laser welding apparatus.

By means of the last described adjusting process it is assured that the assembled relay is guaranteed to actuate, or pull its armature, by application of a required minimum attraction voltage. Because the minimum attraction voltage is applied to the relay during adjustment, and the adjustment is made until actuation of the relay takes place, this adjustment process also, at the same time, represents an inspection process.

In this manner, the rejection rate of microrelays because they are not within tolerance limits of minimum attraction voltages is reduced to zero.

It is particularly beneficial if during assembly of a microrelay all three described variations of the process of this invention are applied for the same relay. This is true, for example, for the relay that is depicted in the drawings with which the embodiments of this inventive process are explained.

By means of the process of this invention various relay components, namely, contact springs, contact tongues, and the magnetic coil which is part of the yoke (yoke-rivet-group) can be adjusted in a particularly beneficial manner.

In a preferred embodiment, the process of this invention is carried out on all three above mentioned relay components in series, one after the other, whereby finished relays can be manufactured to have particularly higher quality.

From a practical point of view one chooses a measuring device and a suitable welding apparatus in dependence upon characteristics of components to be adjusted. To fixedly attach the adjusted components the employment of ultrasound welding apparatus for welding resinous plastic materials and the employment of laser welding apparatus for the welding of metallic materials have proven to be uncomplicated and quick.

It is a particularly beneficial use of the process of this invention to use it for adjusting the position of the switching contact spring. Because the minimum attraction voltage represents a defining parameter it is appropriated to apply, when doing this, a predetermined minimum attraction voltage to the magnetic coil of the relay. Thereafter, a slidable coupling element of the switching contact spring is shoved, or slid, until an armature thereof is pulled, or moved by the energize coil.

A particular benefit to be recognized is that it can be easily monitored in an uncomplicated manner when the switching contact spring reaches its desired position:

In this regard, a simple current measuring device, which is in circuit between terminal leads of the switching contact spring and the normally-open contact so that it can monitor the closing of these contacts, is especially suitable therefor.

A further benefit of such an adjusted relay is that an actual minimum attraction voltage is always smaller or the same as a predetermined desired actuation voltage which means that the rejection rate, because of exceeded minimum-actuation-voltage tolerances is zero.

A particular benefit of the process of this invention is that the adjustment of the relay components during assembly thereof results also with the assembly of the relay so that no separate adjustment work must be done. To clarify the process of this invention the drawings depict a relay during various phases of its manufacturing process. The process of this invention is thusly used to adjust three various relay components.

While the invention has been particularly shown and described with reference to a preferred embodiment, it will be understood by those of ordinary skill in the art that various changes in form and detail may be made therein without departing from the spirit and scope of the invention.

The embodiments of the invention in which an exclusive property or privilege are claimed are defined as follows:

1. A process for the adjustment of components of a relay having a base plate with a plurality of terminal tongues extending therethrough with a normally-open contact tongue thereof supporting a normally-open contact and having a substantially L-shaped bend therein, a switching contact spring including a switch contact and an armature attached thereto, and a magnetic system comprising a magnetic coil, a coil core, and a yoke, said process involving adjustment of the position of the normally-open contact and including the steps of:
   providing on a first leg of the L-shaped normally-open contact on which the normally-open contact is supported at least one finger;
   supporting fixedly by the base plate a drawer-cavity-forming element for defining a cavity with which the at least one finger engages;
   with an adjustment stamp, manipulating the first leg of the L-shaped normally-open contact tongue to shove the at least one finger into the cavity of the drawer-cavity-forming element;
   with a measuring device, monitoring a first space between the normally-open contact and the switch contact which is in a normally-closed position; and
   comparing the monitored first space with a desired first space with a measuring device, and when the measuring device determines that the monitored first space has reached the desired first space, automatically issuing a signal from the measuring device to a welding device which welds, and thereby affixes, the at least one finger in the drawer-cavity-forming element.

2. A process as in claim 1 wherein the at least one finger is welded by means of an ultrasound welding apparatus.

3. A process as in claim 1 wherein the at least one finger is welded by means of a hot stamp.

4. A process for the adjustment of components of a relay having a base plate, with a plurality of terminal tongues extending therethrough, with a normally-open contact tongue thereof supporting a normally-open contact and having a substantially L-shaped bend therein, a switching contact spring including a switch contact and an armature attached thereto, and a magnetic system comprising a magnetic coil, a coil core, and a yoke, said process involving adjustment of the position of a magnetic system including the steps of:
   forming the magnetic system into a yoke-rivet-group comprising the magnetic coil, the magnetic core, and the yoke which is riveted to the core;
   providing a switching contact spring having an armature riveted thereto;
   slidably mounting a portion of the yoke in a guiding slide mounted on the base plate;
   applying a sufficiently high voltage to the magnetic coil so that the armature attracts the core of the magnetic coil to it;
   simultaneous with application of the voltage, shoving the yoke-rivet-group toward the armature until the magnetic coil pulls the armature to it;
   shoving the yoke-rivet-group until a measuring device determines that a predetermined spacing exists between the armature, which is against the core of the magnetic coil, and the switching contact spring; and
   in response to the measuring device recognizing the predetermined spacing, automatically issuing a signal with the measuring device to a welding apparatus which in response thereto welds the portion of said yoke in the guiding slide to thereby affix its position thereto.

5. A process as in claim 4 wherein the yoke portion is welded by means of an ultrasound apparatus.

6. A process as in claim 4 wherein the yoke portion is welded by means of a hot stamp.

7. A process for the adjustment of components of a relay having a base plate with a plurality of terminal tongues extending therethrough, with a normally-open contact tongue thereof supporting a normally-open contact and having a substantially L-shaped bend therein, a switching contact spring including a switch contact and an armature attached thereto, and a magnetic system comprising a magnetic coil, a coil core, and a yoke, said process involving adjustment of the position of the switching contact spring and including the steps of:

providing a coupling element that is coupled to the switching contact spring;

slidably placing the coupling element on a portion of one of the terminal tongues;

placing a characteristic attraction voltage on the magnetic coil of the relay;

monitoring movement of the armature relative to the coil with a measuring device;

shoving the coupling element along the portion of the one of the terminal tongues until there is a predetermined movement of the armature relative to the coil; and issuing a signal from said measuring device in response to its detecting the predetermined movement of the armature relative to the coil to a welding apparatus which, in response thereto, welds the switching contact spring in its present position to the portion of the terminal tongue.

8. A process as in claim 7 wherein the measuring device is in circuit between two terminal tongues which monitors if an electrical connection exists between the normally-open contact and the switch contact.

9. A process as in claim 7 wherein the welding of the coupling element to the portion of the terminal tongue is done with a laser welding apparatus.

10. A process as in claim 7 said process also involving adjustment of the position of the normally-open contact and including the steps of:

providing on a first leg of the L-shaped normally-open contact on which the normally-open contact is supported at least one finger;

supporting fixedly by the base plate a drawer-cavity-forming element for defining a cavity with which the at least one finger engages;

with an adjustment stamp, manipulating the first leg of the L-shaped normally-open contact tongue to shove the at least one finger into the cavity of the drawer-cavity-forming element;

with a measuring device, monitoring a first space between the normally-open contact and the switch contact which is in a normally-closed position; and comparing the monitored first space with a desired first space with a measuring device, and when the measuring device determines that the monitored first space has reached the desired first space, automatically issuing a signal from the measuring device to a welding device which welds, and thereby affixes, the at least one finger in the drawer-cavity-forming element;

said process further involving adjustment of the position of a magnetic system including the steps of:

forming the magnetic system into a yoke-rivet-group comprising the magnetic coil, the magnetic core, and the yoke which is riveted to the core;

providing a switching contact spring having an armature riveted thereto;

slidably mounting a portion of the yoke in a guiding slide mounted on the base plate;

applying a sufficiently high voltage to the magnetic coil so that the armature attracts the core of the magnetic coil to it;

simultaneous with application of the voltage, shoving the yoke-rivet-group toward the armature until the magnetic coil pulls the armature to it;

shoving the yoke-rivet-group until a measuring device determines that a predetermined spacing exists between the armature, which is against the core of the magnetic coil, and the switching contact spring; and in response to the measuring device recognizing the predetermined spacing, automatically issuing a signal with the measuring device to a welding apparatus which in response thereto welds the portion of said yoke in the guiding slide to thereby affix its position thereto.

* * * * *